United States Patent Office 2,940,953
Patented June 14, 1960

2,940,953

EPOXIDE RESINS

William J. Belanger, Louisville, Ky., assignor to Devoe & Raynolds Company, Inc., Louisville, Ky., a corporation of New York No Drawing. Filed May 2, 1957, Ser. No. 656,489

8 Claims. (Cl. 260—47)

This invention relates to the production of epoxide resins and includes the new products and the method of producing them.

The new epoxide resins are produced by reacting cyanuric acid with a mixture of diepoxides and monoepoxides in proportions such that all of the acid groups of the cyanuric acid are reacted with epoxide groups and the reaction product contains one or more epoxide groups per molecule.

In the process of the present invention, the three reactive acid groups of the cyanuric acid are reacted in part with a diepoxide and in part with a monoepoxide, in proportions such that the reaction product still contains one or more epoxide groups of the diepoxide used. The products thus vary from products containing one epoxide group per molecule or the monoepoxide, to products containing 2, 3, or 4 epoxy groups per molecule, which are diepoxides, triepoxides or tetraepoxides, which may be monomeric or polymeric in character.

When cyanuric acid and diepoxides are reacted in the absence of monoepoxides, polyepoxides are obtained containing three or more epoxide groups, when a sufficient excess of diepoxide is used. Thus, 3 mols of a diepoxide can react with 1 mol of cyanuric acid through one of their epoxide groups, to give a product which is essentially a triepoxide. Such polyepoxides produced by reacting cyanuric acid with an excess of a diepoxide, sufficient to react with all of the acid groups of the cyanuric acid and to give a reaction product containing three or more epoxide groups per molecule, are described in the Cooke application Serial No. 656,488, filed on May 2, 1957.

In the process of the present invention, and in producing the new epoxide products of the present invention, a mixture of diepoxide and monoepoxide is used in proportions sufficient to react with all of the acid groups of the cyanuric acid, but with only part of the epoxide groups of the diepoxide used.

Cyanuric acid is trifunctional and has three acid groups which can react with an epoxide group of the diepoxide or of the monoepoxide. The proportions of cyanuric acid, diepoxide and monoepoxide used are such that the total number of epoxide groups employed for reaction with the cyanuric acid is greater than the number of acid groups of the cyanuric acid.

In general, the proportions of monoepoxide, diepoxide and cyanuric acid are such that if X represents the mols of a diepoxide, and Y the mols of a monoepoxide, per mol of cyanuric acid, X equals at least 1 but not more than 2, Y equals at least 1 but not more than 2, and X plus Y equals not more than 3, but substantially more than 2, e.g., around 2.33, and the total number of epoxide groups employed for reaction with the cyanuric acid is greater than the number of acid groups supplied by the cyanuric acid.

The proportions of cyanuric acid, diepoxide and monoepoxide can thus be varied to produce products which are primarily monomeric monoepoxides or monomeric diepoxides or a monomeric mixture; or proportions in which polymeric monoepoxides, diepoxides, triepoxides or tetraepoxides are produced. Thus, for example, the reaction of 1 mol of cyanuric acid with 3 acid groups, with 2 mols of a diepoxide and 1 mol of a monoepoxide, gives a product which is mainly a diepoxide; while a product which is mainly a monoepoxide is obtained by reacting 2 mols of monoepoxide and 1 of diepoxide with 1 mol of cyanuric acid. If 3 mols of diepoxide and 3 mols of monoepoxide are reacted with 2 mols of cyanuric acid, an epoxide of more complex nature is obtained containing largely or mainly a mixture of mono and diepoxides. In these reactions, $X+Y=3$.

By using a somewhat smaller ratio of diepoxide plus monoepoxide to cyanuric acid, polymeric products, or products which are mainly polymeric products, are obtained. Thus, the reaction of 2 mols of cyanuric acid with 2 mols of diepoxide and 3 mols of monoepoxide gives a product which is mainly a polymeric monoepoxide. The reaction of 2 mols of cyanuric acid with 3 mols of diepoxide and 2 mols of monoepoxide gives a product which is mainly a polymeric diepoxide. The reaction of 2 mols of cyanuric acid with 4 mols of diepoxide and one of monoepoxide gives a product which is largely or mainly a polymeric triepoxide.

If 3 mols of cyanuric acid are reacted with 6 mols of diepoxide and 1 mol of monoepoxide, a polymeric product is obtained of the nature of a tetraepoxide. The reaction of 3 mols of cyanuric acid with 5 mols of diepoxide and 2 mols of monoepoxide gives a polymeric product of the nature of a triepoxide. The reaction of 3 mols of cyanuric acid with 4 mols of diepoxide and 3 mols of monoepoxide gives a polymeric product which is of the nature of a diepoxide. And the reaction of 3 mols of cyanuric acid with 3 mols of diepoxide and 4 mols of monoepoxide gives a product which is of the nature of a polymeric monoepoxide.

The diepoxides used include aliphatic diepoxides and aromatic diepoxides such as the diglycidyl ethers of dihydric alcohols and dihydric phenols. Liquid or low melting point expoxide resins are produced by the reaction of dihydric phenols and epichlorhydrin in the presence of caustic alkali. These resins may be essentially monomeric in character, such as a diglycidyl ether of a dihydric phenol, or they may be somewhat polymeric in character, and the average epoxide content of the resin may be somewhat less than that corresponding to a diepoxide, in which case the diepoxide equivalent of the resin is the amount of resin required to furnish two epoxy groups. Aliphatic diepoxides such as those described in Patent No. 2,581,464 or other aliphatic diepoxides can also be used.

The monoepoxides used also include aliphatic monoepoxides and aromatic monoepoxides such as the monoglycidyl ethers of aliphatic monohydric alcohols and monohydric phenols, and monoglycidyl esters of monobasic acids. The monoepoxide may be one resulting from the reaction of a diepoxide with a monohydric phenol or a monobasic acid in equimolecular proportions.

The reaction between the cyanuric acid, the diepoxide and the monoepoxide is advantageously carried out with the use of a catalyst, and particularly with a suitable organic base as a catalyst, such as tertiary amines, e.g., tripropyl amine and dimethyl aniline; quaternary ammonium hydroxides such as benzyl trimethyl ammonium hydroxide; quaternary ammonium salts such as benzyl trimethyl ammonium chloride; and quaternary ammonium ion-exchange resins. Quaternary ammonium salts such as benzyl trimethyl ammonium chloride are particularly advantageous.

The products will vary in their epoxide equivalents. The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

Products varying in their epoxide content can be produced by regulating the proportions of monoepoxide and diepoxide used to react with the cyanuric acid.

The process is advantageously carried out in the presence of an organic solvent and at the reflux temperature of the solvent. Cyanuric acid has only a very limited solubility in most organic solvents. It gradually and progressively dissolves in the solvent and reacts apparently as soon as dissolved. Apparently as the first hydroxyl group on the cyanuric acid reacts, the product becomes more soluble, so that the other two hydroxyl groups can more readily react. The reaction appears to be complete when all of the cyanuric acid in suspension has become soluble or shortly thereafter.

The invention will be further illustrated by the following examples, but it will be understood that the invention is not limited thereto. In the examples, the parts are by weight.

The polyepoxide prepared in the following example approximates or is made up largely of a diepoxide (2 epoxide equivalents per molecule) resulting from the reaction of the trifunctional cyanuric acid with a diepoxide and a monoepoxide in the molar ratio of 2 to 3 to 2.

*Example I*

The diepoxide used in this example was prepared as follows:

In a reaction vessel equipped with an agitator, thermometer and condenser, about 1 mol of bisphenol is dissolved in 10 mols of epichlorhydrin and 1 to 2 percent water is added to the resulting mixture. The mixture is then brought to 80° C. and 2 mols of sodium hydroxide are added in small portions over a period of about 1 hour. During the addition the temperature of the mixture is held at about 90° C. to 110° C. After the sodium hydroxide has been added, the water formed in the reaction and most of the epichlorhydrin is distilled off. The residue is combined with an approximately equal amount of benzene and the mixture filtered to remove the salt. The benzene is then removed to yield a viscous liquid having a weight per epoxide of 185.

This diepoxide was reacted with cyanuric acid to produce a polyepoxide, as follows:

Into a reaction vessel equipped with an agitator, condenser and thermometer are charged cyanuric acid, 43.0 parts (0.333 mol); the diepoxide prepared as above described, 185 parts (0.50 mol); and phenyl glycidyl ether, 50.0 parts (0.333 mol) together with a 60 per cent aqueous solution of benzyltrimethylammonium chloride (4.6 parts, 1 percent by weight based on the weight of the reactants) as a catalyst for the reaction. Dioxane (150.0 parts) is employed as a solvent for the reaction. The vessel contents are heated at 110° C. until complete solution of cyanuric acid results approximately 3½ hours, and then adding an additional 100.0 parts of dioxane to decrease the viscosity of the reaction mixture. The vessel contents are cooled and after adding ethyl cellosolve (167.0 parts) the reaction mixture is filtered.

The polyepoxide-containing solution had a viscosity of V to W (Gardner-Holdt) and a non-volatile content of 42.0 percent. The resulting polyepoxide, after being freed from the solvent, had a melting point of 89° C., (Durrans' Mercury Method) and an epoxide equivalent of 992.

A blend of 50.0 parts of the polyepoxide of this example with 1.0 part of tetraethylene pentamine is prepared. A portion of this blend is drawn down to a 3 mil film and baked at 150° C. for 30 minutes. Another portion of this blend is drawn down to a 3 mil film and is cured at room temperature for 48 hours. Both cured films were colorless, hard and tough; and possessed excellent mar resistance, adhesion and flexibility properties.

*Example II*

The diepoxide used in this example was prepared as follows:

About 536 parts (2.35 mols) of bisphenol and 211 parts (5.17 mols) of sodium hydroxide (10 percent excess) are combined in 1900 parts of water and heated to about 23° C. whereupon 436 parts (4.70 mols) of epichlorhydrin are added rapidly. The temperature is increased and remains at about 90° C to 100° C. for 1 hour and 40 minutes. The mixture is separated into a 2 phase system and the aqueous layer drawn off. The resinous layer that remains is washed with hot water and then drained and dried at a temperature of about 140° C. The Durrans' Mercury Method melting point of the resulting product is 50° C. and the weight per epoxide is 325.

In accordance with the procedure outlined in Example I, a polyepoxide is prepared by reacting cyanuric acid, 25.8 parts (0.20 mol); the diepoxide prepared as above described, 195.0 parts (0.30 mol); and phenyl glycidyl ether, 30.0 parts (0.20 mol) in the presence of a 60 percent aqueous solution of benzyltrimethylammonium chloride (4.2 parts) as a catalyst, and dioxane (167.2 parts) as solvent for the reaction. After heating at 110° C. until solution of the cyanuric acid is complete, approximately two hours, dioxane (140.0 parts) is added to decrease the viscosity of the solution, and the reaction mixture is cooled and filtered.

The resulting polyepoxide-containing solution had a viscosity of Y (Gardner-Holdt) and a non-volatile content of 45.9 percent. The polyepoxide, after being stripped of solvent, had a melting point of 97° C. (Durrans' Mercury Method) and a weight per epoxide of 1676.

A blend of 50.0 parts of the polyepoxide of this example with 0.75 part of tetraethylene pentamine is prepared. A portion of this blend is drawn down to a 3 mil film and baked at 150° C. for 30 minutes. Another portion of this blend is drawn down to a 3 mil film and is cured at room temperature for 48 hours. Both cured films were colorless, hard and tough, and possessed excellent adhesion, flexibility, and good mar resistance.

The polyepoxide prepared in the following example approximates or is made up largely of a triepoxide (3 epoxy equivalents per molecule) resulting from the reaction of the trifunctional cyanuric acid with a diepoxide and a monoepoxide in a molar ratio of 2 to 4 to 1.

*Example III*

In accordance with the procedure outlined in Example I, a polyepoxide is prepared by reacting cyanuric acid, 48.4 parts (0.375 mol); the diepoxide prepared in Example I, 277.5 parts (0.75 mol); and glycidyl benzoate, 31.5 parts (0.1875 mol) in the presence of a 60 percent aqueous solution of benzyltrimethylammonium chloride (6.0 parts) as a catalyst, and dioxane (238.2 parts) as solvent for the reaction. The reaction mixture is heated at 110° C. until complete solution of the cyanuric acid results, approximately 2 hours, an additional 178.0 parts of dioxane and 119.0 parts of methyl isobutyl ketone are added to reduce the viscosity of the solution. The reaction mixture is then cooled and filtered.

The resulting polyepoxide-containing solution had a viscosity of $Z_3$ to $Z_4$ Gardner-Holdt, and a non-volatile content of 42.0 percent. The resulting polyepoxide, after being freed from solvents, had a melting point of 119°

C. (Durrans' Mercury Method) and a weight per epoxide of 760.

The epoxide resin prepared in the following example approximates or is made up largely of a monoepoxide (one epoxide equivalent per molecule) resulting from the reaction of the trifunctional cyanuric acid with a diepoxide and a monoepoxide in a molar ratio of 2 to 2 to 3.

*Example IV*

As described in the procedure in Example I, an epoxide is prepared by reacting 51.6 parts (0.40 mol) of cyanuric acid; 148.0 parts (0.40 mol) of the diepoxide of Example I and 90.0 parts (0.60 mol) of phenyl glycidyl ether in the presence of 4.8 parts of a 60 percent aqueous solution of benzyltrimethylammonium chloride, as catalyst, and 193.0 parts of dioxane as solvent for the reaction. After heating the reaction mixture to complete solution of the cyanuric acid, approximately 2 and ⅓ hours at 110° C., 96.6 parts of methyl isobutyl ketone and 64.3 parts of dioxane are added to decrease the viscosity of the mixture, and the solution is cooled and filtered.

The resulting solution had a viscosity of I (Gardner-Holdt), and a percent non-volatile of 45.7. The resulting resin after being freed from solvent, had a melting point of 70° C. (Durrans' Mercury Method) and a weight per epoxide of 1148.

The epoxide resin prepared in the following example approximates or is made up largely of a monoepoxide (1 epoxy equivalent per molecule) resulting from the reaction of the trifunctional cyanuric acid with a diepoxide and a monoepoxide in a molar ratio of 3 to 3 to 4.

*Example V*

In accordance with the procedure outlined in Example I, an epoxide resin is prepared by reacting 51.6 parts (0.40 mol) of cyanuric acid and 148.0 parts (0.40 mol) of the diepoxide of Example I, with phenyl glycidyl ether, 80.0 parts (0.533 mol) in the presence of 4.7 parts of a 60 percent aqueous solution of benzyltrimethylammonium chloride (1 percent by weight based on the weight of the reactants), as a catalyst, and 186.4 parts of dioxane, as solvent for the reaction. The reaction mixture is heated at 110° C. until complete solution of the cyanuric acid results, approximately 3¾ hours, and 248.5 parts of dioxane are added to decrease the viscosity of the solution. The reaction mixture is cooled and filtered.

The resulting epoxide-containing solution has a viscosity of X to Y (Gardner-Holdt) and a percent non-volatile matter of 48.0, as determined for two hours at 180° C. The epoxide resin, atfer removal of solvent, had a melting point of 72° C. (Durrans' Mercury Method) and a weight per epoxide of 1887.

From the foregoing examples, it will be seen that monoepoxides and polyepoxides and mixtures can be made which are essentially monomeric in character or polymeric to a greater or less extent.

It will also be seen that the epoxide content of the reaction product can be varied and controlled, and products of different degrees of functionality obtained, so far as their reactive epoxy groups are concerned, by regulating and controlling the proportions of diepoxide and monoepoxide used for reaction with cyanuric acid.

Instead of the diepoxides referred to in the above examples, other diepoxides can be used, including other diglycidyl ethers or dihydric phenols and other aromatic and aliphatic diepoxides.

Instead of the monoepoxides referred to in the above examples, other monoepoxides can be used, including aliphatic monoepoxides and aromatic monoepoxides such as monoglycidyl ethers of other monohydric phenols or alcohols or monoglycidyl esters of acids.

The products of the present invention, where they are diepoxides or contain diepoxides or higher polyepoxides, are epoxide resins which can be cured and hardened by the addition of hardening agents such as organic or inorganic bases, etc., or by reaction with other hardening agents.

The products which are primarily monoepoxides are useful as plasticizers and for reactions where a monoepoxide of unusually high molecular weight is desired. They can thus be reacted with cross-linking reagents or reacted with other resins or compounds containing active hydrogen.

I claim:

1. A process for making a resinous material which contains at least one but not more than four epoxy groups per molecule which consists of reacting by heating cyanuric acid with a diepoxide which is a member of the group consisting of diglycidyl ethers of dihydric phenols and diglycidyl ethers of dihydric alcohols in admixture with a 1,2-monoepoxide and an organic base as a catalyst, in the ratio of X mols of a diepoxide to Y mols of a monoepoxide per mol of cyanuric acid wherein X equals at least one but not more than two, Y equals at least one but not more than two, and wherein $X+Y$ equals not more than three but greater than two, and wherein the total number of epoxy groups employed for reaction with the cyanuric acid is greater than the number of hydroxyl groups supplied by the cyanuric acid.

2. The process according to claim 1 in which the epoxide groups of the monoepoxide and diepoxide are around 4 to 5 epoxide groups for 3 acid groups of the cyanuric acid.

3. The process according to claim 1 in which the epoxide groups of the diepoxide and monoepoxide are about 7 to 9 epoxide groups for 6 acid groups of the cyanuric acid.

4. High molecular weight epoxide resins resulting from the reaction with heat of cyanuric acid with a diepoxide which is a member of the group consisting of diglycidyl ethers of dihydric phenols and diglycidyl ethers of dihydric alcohols and a 1,2-monoepoxide in admixture with an organic base as a catalyst in the ratio of X mols of a diepoxide to Y mols of a monoepoxide per mol of cyanuric acid wherein X equals at least one but not more than two, Y equals at least one but not more than two, and wherein $X+Y$ equals not more than three but greater than two, and wherein the total number of epoxy groups employed for reaction with the cyanuric acid is greater than the number of hydroxyl groups supplied by the cyanuric acid.

5. High molecular weight epoxide resins as defined in claim 4 containing at least one epoxide group per molecule.

6. High molecular weight epoxide resins as defined in claim 4 containing at least two epoxide groups per molecule.

7. High molecular weight epoxide resins as defined in claim 4 containing at least three epoxide groups per molecule.

8. The process according to claim 1 in which the monoepoxide is a member of the group consisting of monoglycidyl ethers of monohydric alcohols, monoglycidyl ethers of monohydric phenols, and monoglycidyl esters of monocarboxylic acids.

References Cited in the file of this patent

UNITED STATES PATENTS 2,741,607     Bradley et al.   ----------- Apr. 10, 1956